United States Patent
Kazawa et al.

(10) Patent No.: US 7,840,137 B2
(45) Date of Patent: Nov. 23, 2010

(54) OPTICAL LINE TERMINAL AND OPTICAL NETWORK UNIT CAPABLE OF ALARM TRANSMISSION SCHEME FOR PASSIVE OPTICAL NETWORK SYSTEM

(75) Inventors: Tohru Kazawa, Kokubunji (JP);
Kenichi Sakamoto, Kokubunji (JP);
Ryosuke Nishino, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 713 days.

(21) Appl. No.: 11/829,500

(22) Filed: Jul. 27, 2007

(65) Prior Publication Data

US 2008/0279549 A1    Nov. 13, 2008

(30) Foreign Application Priority Data

May 9, 2007    (JP)    ............................. 2007-124080

(51) Int. Cl.
*H04J 14/00*    (2006.01)
(52) U.S. Cl. ............................. 398/72; 398/68; 398/71; 398/100; 398/17; 370/392; 370/395.4; 370/468; 370/230; 370/235
(58) Field of Classification Search .................. 398/66, 398/67, 68, 69, 70, 71, 72, 79, 98, 99, 100, 398/33, 38, 25, 26, 27, 9, 10, 17, 14, 15, 398/22, 23, 24, 63, 64, 58, 59, 78; 370/468, 370/389, 392, 465, 395.41, 242, 230, 235, 370/395.4

See application file for complete search history.

(56) References Cited

U.S. PATENT DOCUMENTS

2007/0140689 A1*    6/2007    Haran ........................ 398/27

2007/0237523 A1*    10/2007    Miguel et al. ............... 398/71

FOREIGN PATENT DOCUMENTS

| JP | 11-122306 | 4/1999 |
|---|---|---|
| JP | 2001-197096 | 7/2001 |

(Continued)

OTHER PUBLICATIONS

"Series G: Transmission Systems and Media, Digital Systems and Networks," International Telecommunication Union, G.984.4, Jun. 2004, pp. 1-110.

(Continued)

*Primary Examiner*—Hanh Phan
(74) *Attorney, Agent, or Firm*—McDermott Will & Emery LLP

(57) ABSTRACT

A station-side apparatus adapted for use in a passive optical network (PON) system is disclosed, which remotely collects inside information of optical network terminals (ONTs) even before completion of start-up of an optical network unit (ONU), permits an obstruction-detected ONU to send out an emergency notification message to the station-side apparatus, e.g., optical line terminal (OLP), and permits the OLT that received this message to interrupt the transmission of an upload signal toward another ONU after the elapse of a fixed length of time while at the same time receiving information from the obstruction-suffering ONU to thereby facilitate cut-and-divide or "segmentation" of obstruction. A subscriber-side device for use in the PON system is also disclosed.

6 Claims, 16 Drawing Sheets

FOREIGN PATENT DOCUMENTS

| | | |
|---|---|---|
| JP | 2003-259003 | 9/2003 |
| JP | 2004-258942 | 9/2004 |

OTHER PUBLICATIONS

"Series G: Transmission Systems and Media, Digital Systems and Networks," International Telecommunication Union, G.983.1, Jan. 2005, pp. 1-122.

"Series G: Transmission Systems and Media, Digital Systems and Networks," International Telecommunication Union, G.984.3, Feb. 2004, pp. 1-107.

"Series G; Transmission Systems and Media, Digital Systems and Networks," International Telecommunication Union, G.983.4, Jan. 2005, p. 1.

"Series G: Transmission Systems and Media, Digital Systems and Networks," International Telecommunication Union, G.984.1, Mar. 2003, pp. 1-14.

"Series G: Transmission Systems and Media, Digital Systems and Networks," International Telecommunication Union, g.984g2, Mar. 2003, pp. 1-29.

Japanese Office Action, with English translation, issued in Japanese Patent Application No. 2007-124080, mailed Aug. 25, 2009.

\* cited by examiner (XX Km) INDICATES THE FIBER LENGTH BETWEEN OLT AND ONU.

OPTICAL LINE TERMINAL AND OPTICAL NETWORK UNIT CAPABLE OF ALARM TRANSMISSION SCHEME FOR PASSIVE OPTICAL NETWORK SYSTEM

INCORPORATION BY REFERENCE

The present application claims priority from Japanese application JP2007-124080 filed on May 9, 2007, the content of which is hereby incorporated by reference into this application.

BACKGROUND OF THE INVENTION

The present invention relates to a passive optical network (PON) system with a plurality of subscriber link devices sharing an optical transmission line.

The PON is generally made up of a single station-side apparatus, such as an optical line terminal (OLT), and a plurality of subscriber-side devices, such as optical network units (ONUs), wherein an optical signal from a terminal, such as a personal computer (PC) being connected to an ONU, is converted into an optical signal, which is then sent out toward the OLT via optical fiber or "fibre" cables. Optic fibers extending from more than two ONUs are coupled together by an optical multipoint splitter, and the optical signal is arrived at the OLT while being applied optical (time-division) multiplexing by this optical splitter.

The length of an optic fiber between ONU and OLT is defined in the ranges of 0 to 20 km, 20 to 40 km, and 40 to 60 km, for example, in clauses 8 and 9 of Recommendation G.984.1 of Telecommunication Standardization Sector of International Telecommunication Union ("ITU-T"). Each ONU is installed at a given distance from OLT, which falls within the ranges. Accordingly, transmission delay of an optical signal between OLT and each ONU is different depending upon an optic fiber length. If this transmission delay is not taken into consideration, it will possibly happen that optical signals as output from respective ONUs collide and interfere with each other during optical multiplexing at the optical splitter.

Consequently, an attempt is made to cause the OLT to adjust, by use of a specific technique called the "ranging" as set forth in clause 10 of ITU-T Recommendation G.984.3, the delay of an output from each ONU in such a way that each ONU is virtually situated at an equal position from the OLT, e.g., at a distance of 20 km therefrom, thereby to ensure that an optical signal from each ONU hardly interferes with the others.

In the ranging, the OLT requires ONUs to transmit a signal for the distance measurement use. When an ONU returns a distance measurement frame, OLT receives such signal and then measures the length of a time period of from the issuance of a distance measurement-use signal transmission request to reception of a distance measurement-use signal—that is, reciprocal delay time—to thereby know the exact distance between the ONU and OLT. Subsequently, in order to virtualize all ONUs so that these are at the equal distance, the OLT sends to each ONU an instruction which delays signal transmission by a certain length of time, called the equalized delay amount. For example, in order to force every ONU to have reciprocal delay time of 20 km, the OLT instructs to ONU the equalized delay amount that is equal to a subtraction value of the 20 km reciprocal delay time minus the measured reciprocal delay time. ONU has its circuitry for sending data while delaying it fixedly by the equalized delay amount instructed. In responding to receipt of the above-noted instruction, up-link or upload data transmission is performed in a way such that all the ONUs involved have the reciprocal delay time of 20 km.

Additionally, in order to equitably allocate the communication frequency band of a single optic fiber to a maximally increased number of ONUs in deference to requests from users, a dynamic bandwidth assignment (DBA) technique is also defined in ITU-T Rec. G.983.4, which is for permitting OLT to allocate a transfer channel band (data transmission position/time) in the upstream direction from each ONU. Frequency band control based on this technique is also performed.

For example, according to the definitions of clause 8.2 of ITU-T Rec. G.984.3, a signal to be transferred from more than two ONUs toward OLT is called the upstream signal, i.e., upload signal. This signal consists essentially of a preamble, a delimiter, and a payload signal. As shown in FIG. 8-2 in clause 8 of ITU-T Rec. G.984.3, a guard time is set immediately before each upload signal in order to prevent unwanted collision with its previous burst signal. Also note that according to the definitions of clause 8.1 of this ITU-T recommendation, a signal being sent from OLT to more than two ONUs is called the downstream signal—i.e., download signal. This signal consists essentially of a frame sync pattern, a physical layer operations/administration and maintenance (PLOAM) field, an upstream bandwidth map (USBWmap) field, and a frame payload.

As shown in clause 8.1.3.6 of ITU-T Rec. G.984.3, the OLT uses the USBWmap field to designate each ONU's upload signal transmission allowing timing. The USBWmap field has a start value that designates the start-up of transmission allowance and an end value that designates termination, wherein designation is performed in units of bytes, respectively. This value is also called the grant value in the meaning of allowing signal transmission. And, a difference between the end value and a start value next thereto is an upload signal absence or "null" field, which corresponds to the guard time stated above. It is noted here that two or more band allocation units, called the transmission containers (T-CONTs), are allocable to the individual ONU, causing the assignment of upload signal transmission grant timing to be performed with respect to each T-CONT.

SUMMARY OF THE INVENTION

In the PON system of the type stated above, the OLT instructs by grant an appropriate upload signal transmission timing to each ONU, thereby preventing collision of signals from respective ONUs involved. Accordingly, an ONU which suffers from certain kind of obstruction and thus becomes unable to correctly receive download signals from the OLT is no longer able to know the transmission timing of an upload signal to be instructed from OLT. Due to this, in order to avoid collision of such signal with an upload signal of another ONU, it is required to stop the upload signal transmission of the ONU that became unable to receive any download signals.

Accordingly, upon detection of a reception alarm which is series to an extent that the grant from the OLT is not receivable successfully, such as for example the loss of signal (LOS), loss of frame (LOF), etc., the ONU must stop its upload signal transmission as set forth in the ITU-T Rec. G.984.3. This processing is needed without doubt in order to guarantee the transmission quality of the other ONUs with proper operabilities; however, on the other hand, it suggests that there is no means for transmitting to the OLT the situation of alarm generation of an ONU suffering from occurrence of abnormality and/or inside information of ONU as defined in ITU-T Rec. G.984.4.

When facing with obstructions including start-up interruption or "freeze" of ONU, a manager of the PON system considers that s/he wants to know from a management center the ONU's alarm generation situation, communication logs and inside information of ONU in order to explore the cause of such abnormality in greater detail. However, because of the fact that any upload signal transmission from ONU to OLT is interrupted, it is needed for a worker(s) to go to a site at which the obstruction-occurred ONU is installed and then collect information thereof. This is a time-consuming and troublesome work at increased costs.

It is therefore an object of this invention to provide a PON system capable of remotely collecting inside information of ONUs even prior to completion of startup of ONUs to thereby facilitate cut-and-divide processing or "segmentation" of obstruction.

To attain the foregoing object, a technique unique to the invention is employed, which is for causing an obstruction-detected ONU to send forth an emergency notification message toward OLT and for causing the OLT that received this message to force the other ONUs to stop upload signal transmission thereof while at the same time receiving information from the obstruction-occurred ONU.

According to this invention, it is possible to provide the PON system capable of detecting obstruction within ONT even before the completion of startup of ONU to thereby facilitate obstruction segmentation.

Other objects, features and advantages of the invention will become apparent from the following description of the embodiments of the invention taken in conjunction with the accompanying drawings.

DETAILED DESCRIPTION OF THE INVENTION

Figure 1:
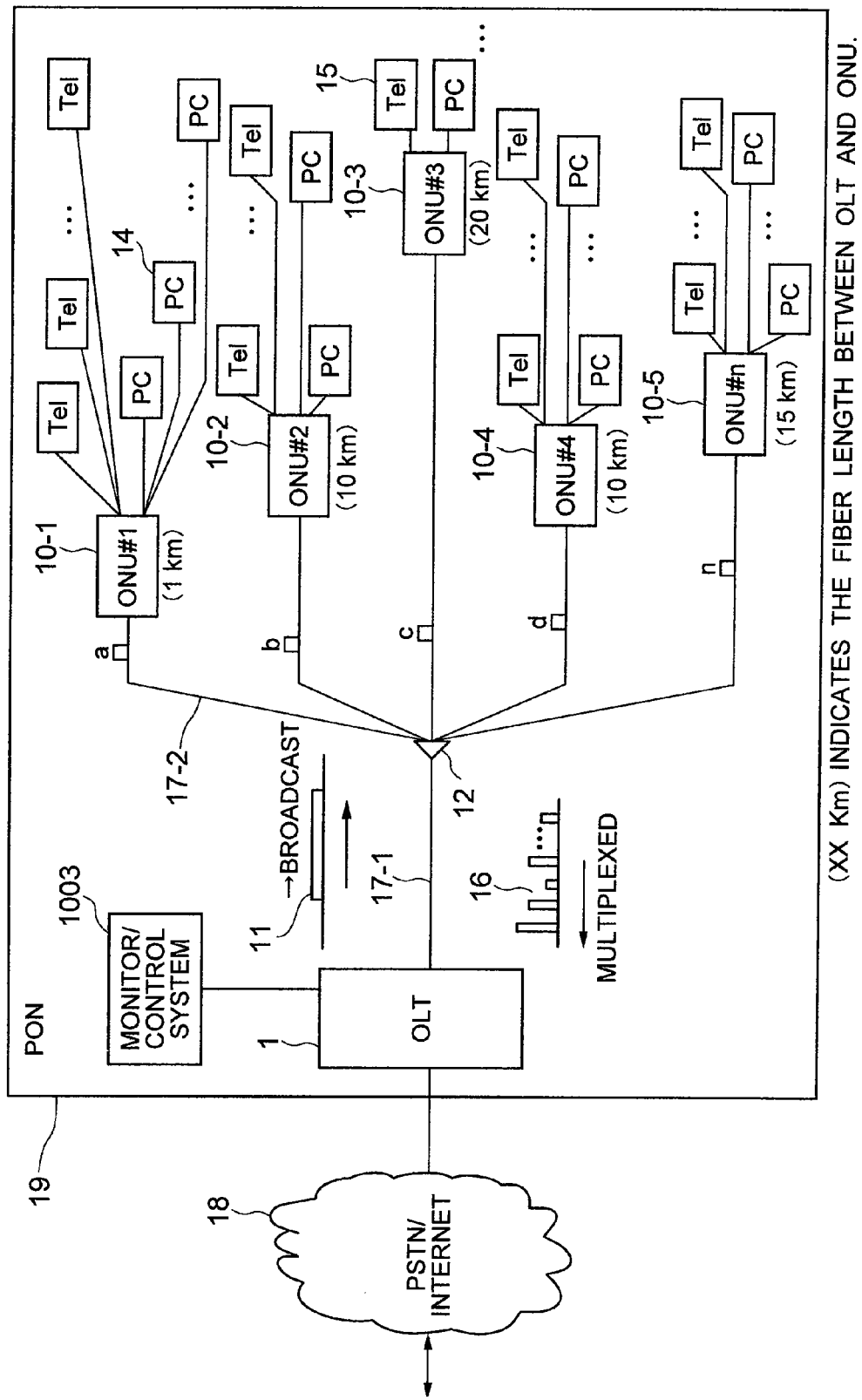
FIG. 1 is a diagram showing an exemplary configuration of an optical access network embodying the invention.

An exemplary configuration of an optical access network (OAN) embodying the present invention is shown in FIG. 1. A passive optical network (PON) 19 is generally made up of an optical multipoint branch device 12, such as optical splitter/optical coupler, a station-side apparatus 1 which is installed in a station building of a communications business entity, such as an optical line terminal (OLT), a trunk line fiber or "fibre" 17-1 for connection between the OLT 1 and the optical splitter, a plurality of subscriber-side devices 10 which are situated in respective subscriber houses or at nearby locations thereof, such as optical network units (ONUs), and a plurality of branched line fibers 17-2 for connection between the optical branch 12 and the ONUs 10. The OLT 1 is connectable, for example, to thirty two (32) ONUs 10 via the trunk-line fiber 17-1 and optical branch 12 plus feeder fiber 17-2. These ONUs 10 are each connected to one or more user terminals, such as a telephone 15 and a personal computer (PC) 14 or else. The PON 19 is linkable via the OLT 1 to a public switched telephone network (PSTN) or the Internet 18, for performing transmission and reception of data to and from these upper-level networks. An entirety of the OLT 1 and ONUs 10 is under management of a monitor/control system 1003.

In FIG. 1, five separate ONUs 10 are depicted, and a signal 11 that is transferred in the downstream direction from OLT 1 to ONU 10 is time-division multiplexed with those signals aimed at respective ONUs 10. Each ONU 10 is responsive to receipt of the download signal 11, for determining whether it is a signal being forwarded to itself and for distributing, if the signal is addressed to itself, this signal to the telephone 15 and/or PC 14 based on the destination of such signal.

On the other hand, in the upstream direction of the OLT 1 from ONUs 10, signals a, b, c, d and e which are transferred from ONUs 10-1 to ONUs 10-n respectively are subjected to time-division multiplexing after having passed through the optical branch 12 to become a signal 16, which is arrived at OLT 1. In short, as it is known beforehand for the OLT 1 which one of the signals from ONUs 10 is received at which timing, it identifies the signal from each ONU 10 in accordance with the timing of signal reception and then performs processing.

Figure 2:
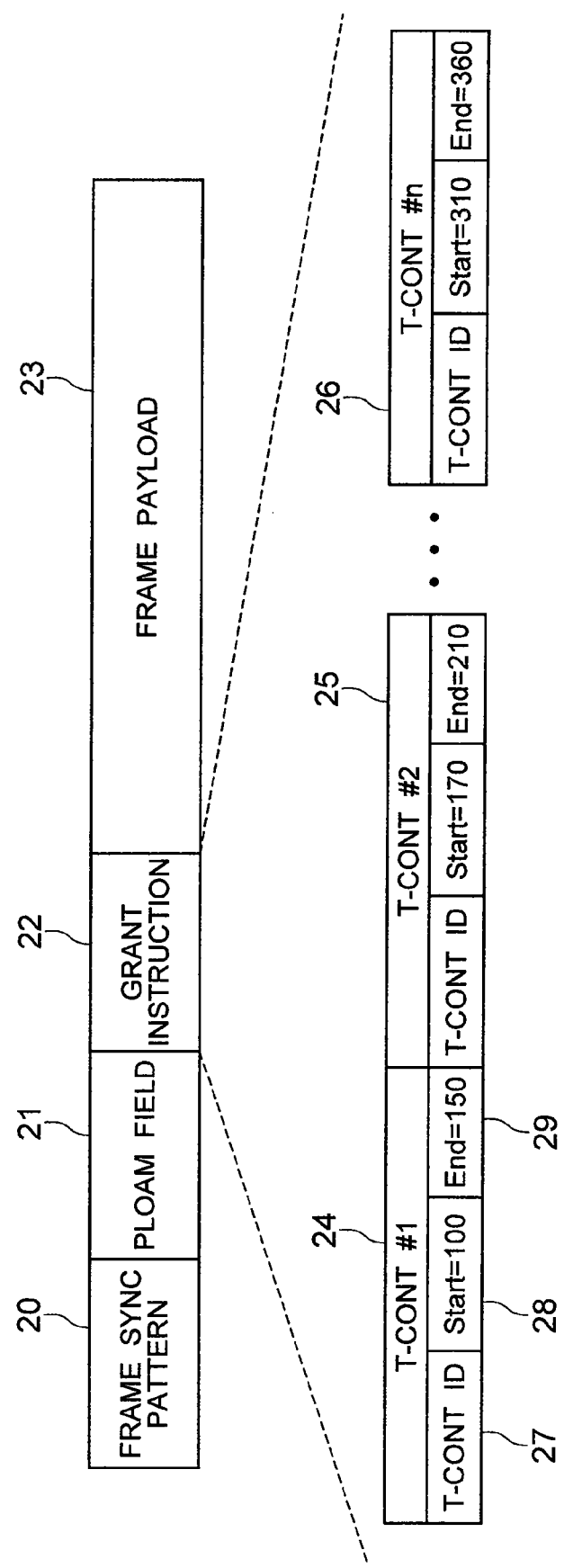
FIG. 2 depicts one example of a download signal being sent from an OLT to ONU.

See FIG. 2, which shows an exemplary frame structure of a downstream PON signal to be sent from the OLT 1 to each ONU 10. The downstream frame consists essentially of a frame sync pattern 20, a field 21 for physical layer operations, administration and maintenance (PLOAM), a grant instruction field 22, and a frame payload 23. The frame payload field 23 is for storage of a user signal being sent from OLT 1 to ONU 10, a detail of which is described in Recommendation G.984.3 of ITU-T. The grant instruction field 22 is made up of a first transmission container (T-CONT#1)—use signal 24 for control of the ONU 10-1, a T-CONT#2—use signal 25 for control of ONU 10-2, . . . , a T-CONT#n signal 26 for control of ONU 10-n. The T-CONT#1 signal 24 contains therein a T-CONT identification (ID) sub-field 27, start value 28 and end value 29.

Note here that the "T-CONT" is the unit for allocation of a band in dynamic bandwidth assignment (DBA); for example, in case ONU 10 has more than two transmission buffers, it is also possible to add to each buffer the T-CONT ID—this is identification information of T-CONT—to thereby provide control from OLT 1 on a per-buffer basis. Although in the embodiment below a case will be described where one ONU has a single T-CONT (buffer), i.e., ONU-ID and T-CONT ID are in one-to-one corresponding relationship, the principles of this invention may also be applicable in a similar way even where one ONU has two or more T-CONTs. In this case, the corresponding relationship between T-CONT ID and ONU-ID that is the information for ONU identification is well manageable by preparing a table indicative of which one of T-CONT IDs is contained in each ONU-ID, by way of example.

The start value 28 is for instruction of the timing that allows start-up of transmission of an optical signal to each ONU. The end value 29 is for instruction of the timing of termination of transmission grant. The start value 28 and end value 29 are designated in units of bytes. The OLT 1 sends to each ONU 10 a message for granting upload data transmission, which signal periodically contains a grant instruction 22, to thereby instruct which part of an upload communication band is used for each ONU 10. These start value 28 and end value 29 are the information indicating that data transmission is to be started and ended at which timings within each cycle for transmission of the grant instruction by OLT 1. Additionally, it is also permissible to instruct from OLT 1 to ONU in such a way as to designate the length of data to be sent in place of the end value and then send the data by a specific data length indicated by the "length" value from the timing of the start value.

Figure 3:
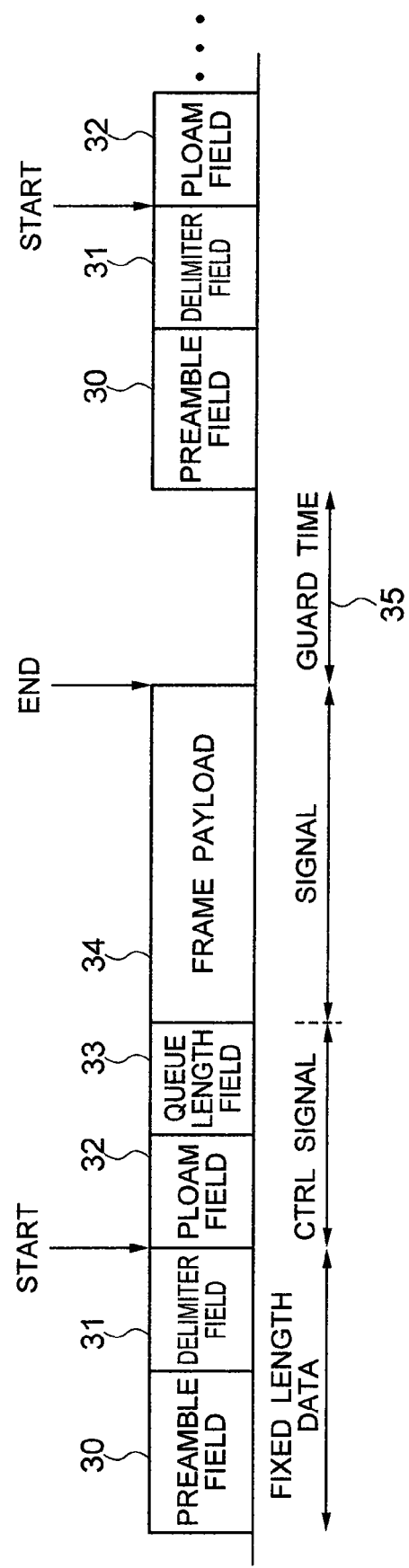
FIG. 3 shows one example of an upload signal of from ONU to OLT.

One example of an upstream PON signal frame to be sent from ONU 10 to OLT 1 is shown in FIG. 3. This upstream PON signal is made up of a preamble field 30, delimiter field 31, PLOAM field 32, queue length field 33, and frame payload 34. The above-stated start value 28 indicates the start position of the PLOAM field 32, that is, the start position of burst data 37 whereas the end value 29 indicates the end position of frame payload 34. ITU-T Recommendation G.984.3 defines that a guard time 35 is a duration of from the end position (end value) of the frame payload 34 of an upload signal to the start position of preamble field 30 of the next upload signal. In this way, the guard time 35 and preamble field 30 plus delimiter field 31 are present between data positions indicated by the start value and end value, so a blank space of several bytes must take place between the previous end value and the next start value.

Figure 4:
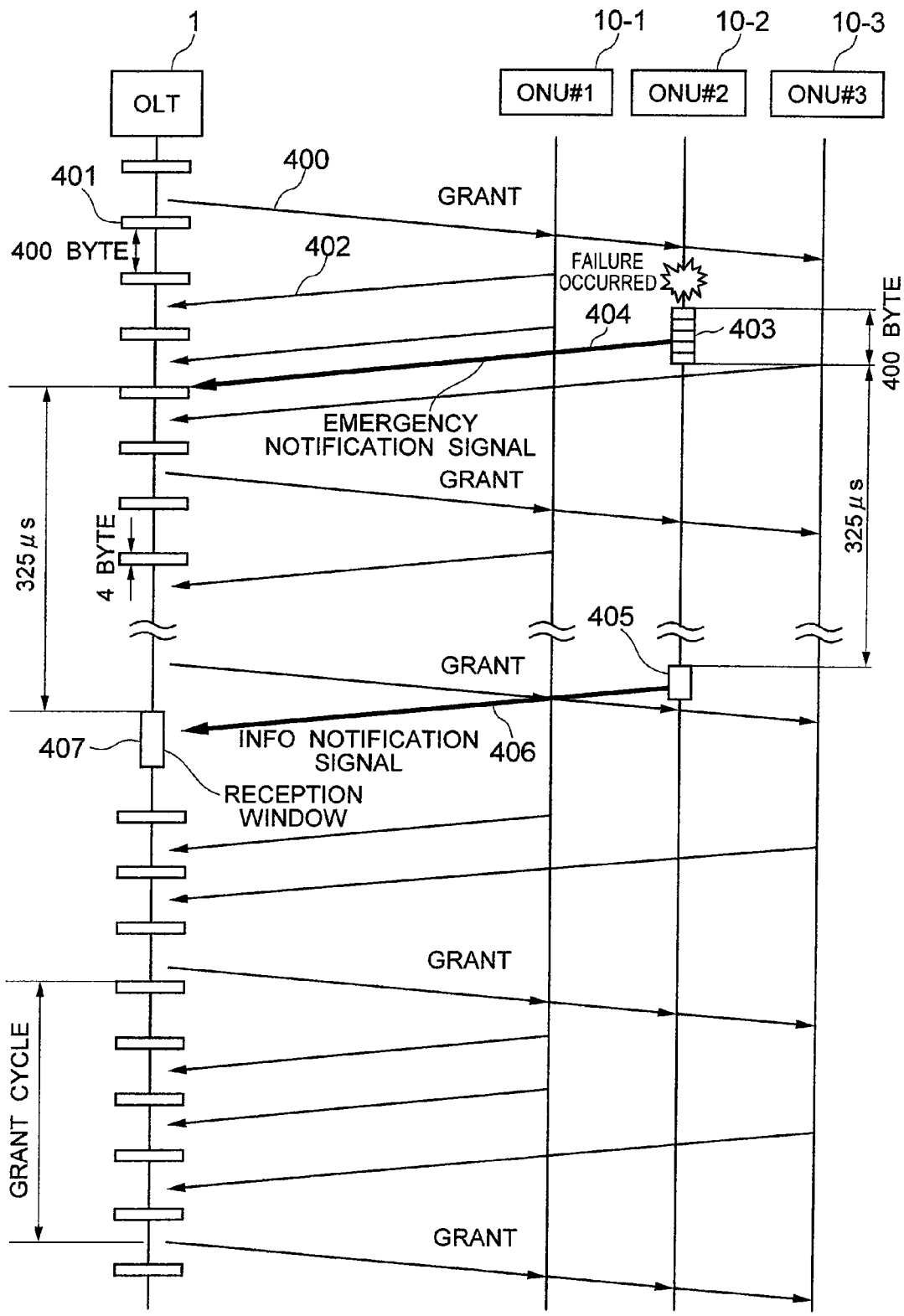
FIG. 4 is a time sequence diagram of communication between ONU and OLT.

Turning to FIG. 4, an overview of a communication between OLT 1 and ONU 10 in the optical access network (OAN) embodying the invention is shown. OLT 1 transmits to each ONU a grant signal 400 which contains the grant instruction 22 shown in FIG. 2 in units of grant cycles. Upon issuance of a reply 402 to this message, each ONU 10 sequentially sends data being presently stored in its own transmission queue in accordance with the timings of the start and end values as designated by the grant signal 400 and at the same time makes a report as to the amount of residual data in the transmission queue.

In the illustrative embodiment, an explanation will be given of a case where obstruction occurs at ONU 10-2. Upon detection of the lack of an ability to properly receive download signals from OLT 1 due to the occurrence of certain kind of obstruction or operation failure, the ONU 10-2 of this embodiment generates an emergency notification signal 403 for notifying OLT 1 that obstruction was occurred and sends this signal as an upload signal 404 to OLT 1.

Figure 5:
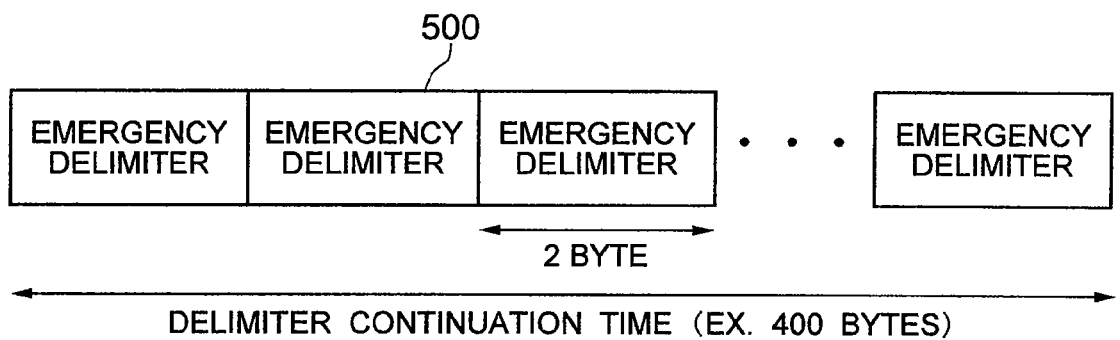
FIG. 5 shows one example of an emergency communication signal.

One example of the emergency notification signal 403 is shown in FIG. 5. This emergency notice signal 403 is a signal in which an emergency-use delimiter 500 made up of a pattern different from the delimiter 31 used in FIG. 2 is repeated for a prespecified length of time. This signal is for use in the event that the obstruction-detected ONU-2 requests the OLT 1 that it interrupts grant to the other ONUs for a predefined length of time period after elapse of a fixed length of time. For example, when letting the emergency delimiter 500 be set to 2 bytes in length and an emergency frame continuation time be 400 bytes, emergency delimiter transmission will be repeated 200 times. This is because of the fact that which follows: in order to lessen the risk of collision with data being sent by another ONU, it is required to maximally shorten the width of the individual upload emergency notice signal while at the same time reducing the width of an entirety of such emergency notice signal also.

As an example, when setting in the emergency delimiter a length of 2 bytes which is detectable even in the presence of bit errors of 3 bits, it is needed that the width of a window capable of reliably receiving an asynchronous emergency delimiter be set at 4 bytes or greater. In order to form such 4-byte window width periodically and also suppress a decrease in upstream transfer capacity to a degree of 1% or more or less, the signal presence interval of an upload signal is set to 396 bytes whereas the window for reception of emergency notice signal is set at 4 bytes. At this time, if a 2-byte emergency delimiter with its width of 400 bytes is recurrently sent as the emergency notice signal, it is possible to receive, without fail, the 2-byte emergency delimiter by the emergency notice signal reception window to be opened to have its width of 4 bytes and the minimum length with a cyclic period of 400 bytes in an asynchronous way.

On the other hand, in order to receive an emergency communication signal 404 that is not predeterminable when sent from an ONU which fails to be in sync with OLT due to occurrence of obstruction without causing it to collide with an upload signal from another ONU, the OLT 1 iteratively generates a periodic window 401 that does not give the transmission allowance to any ONU in units of predefined length of cycles. This is achievable by periodical generation of a timing that does not allow any one of ONUs to perform signal transmission when instructing the upload data transmission timing to each ONU in a way as will be described later. In this embodiment the periodic window is generated with a cycle of 400 bytes, which is the same as the length of the emergency notification signal. By doing so, an overlapping part takes place between the ONU-generated emergency notice signal with its length of 400 bytes and the periodic window to be generated by OLT 1, thereby enabling OLT 1 to receive at least part of the emergency notice signal. In this way, letting the cycle of forming the periodic window 410 be equal to or less than the length of emergency notice signal 403 makes it possible to permit OLT 1 to receive the emergency notice signal 403 successfully.

However, in view of the fact that letting the cycle of forming the periodic window 401 be too short results in a decrease in upload data transfer efficiency of ONU 10, an attempt may be made to form the periodic window 401 with a cycle longer than the emergency notice signal. In this case, the probability of reception of the emergency notification signal 404 may be enhanced by causing ONU 10 to periodically repeat the processing of transmitting emergency notice signal 404 with a predefined length of cycle.

After the elapse of a fixed length of time after having sent an emergency notification signal, the ONU 10-2 prepares information 405 for notifying the OLT 1 of which kind of obstruction was occurred and then sends it to OLT 1 as an information notification signal 406. In this embodiment, the ONU 10-2 is arranged to send the information notification signal 406 after elapse of 325 microseconds (μs) after having sent the emergency notice signal 404. This time of 325 μs is equal to the value of addition of a bi-directional or "reciprocal" delay time of 200 μs in optic fiber with its maximal length of 20 km to 125 μs that is defined by standards as the issuance cycle of the grant 400. Another available approach employable here is to set it to a larger value with addition of the shortest delay time that enables startup of signal transmission after having received the grant within ONU; however, in this embodiment, it is excluded from the calculation under an assumption that this shortest delay time within ONU is a small value less than or equal to 1 μs.

Figure 6:
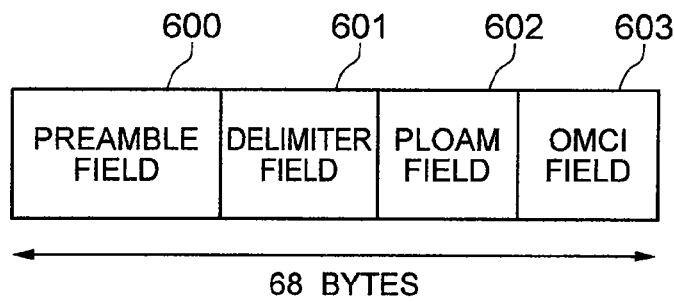
FIG. 6 is one example of an information communication signal.

One example of the information notification signal 406 is shown in FIG. 6. This signal consists essentially of a preamble field 600, delimiter field 601, PLOAM field 602, and ONU management/control interface (OMCI) field 603. Arranging this signal in accordance with ITU-I Rec. G.984.3, it is possible to constitute the preamble field 600 by 6 bytes, delimiter field 601 by 2 bytes, PLOAM field 602 by 12 bytes and OMCI field 603 by 48 bytes—in a total of 68 bytes, by way of example. Using the PLOAM field 602 and OMCI field 603 makes it possible to notify OLT 1 of various kinds of inside information of the ONU 10-2 such as those prescribed in ITU-T Rec. G.984.3 and G.983.2. This OMCI is defined in ITU-T Rec. G.984.4, and the use of this OMCI makes it possible to notify OLT 1 of the inside information of ONU.

In light of the fact that the OLT 1 receives the information notification signal 406 to be sent from the ONU 10-2 after elapse of a fixed length of time since reception of the emergency notification signal 404 from ONU 10-2, a signal reception window 407 is provided, which is a time zone that does not allow the remaining ONUs 10 to send data. This signal reception window 407 also is generatable by giving data transmission allowance to none of the ONUs 10 only in the time zone when OLT 1 provides each ONU 10 with an instruction as to the timing for allowing upload data transmission. In this embodiment the OLT 1 generates the signal reception window 407 after elapse of 325 μs since reception of the emergency notification signal 404. This time interval is arranged to be the same as an interval of from completion of the ONU 10-2's sending the emergency notification signal 404 to transmission of the information notification signal 406. Regarding the width of such reception window, this is of 100 bytes, which is greater than 68 bytes of the size of information notice signal 406. By appropriately modifying the time interval up to the generation of signal reception window 407 and the window's width on a case-by-case basis, it is possible to increase the probability of correct reception of information notification signal 405 at OLT 1. For instance, further enlarging the width of signal reception window 407 makes it possible to shorten the time spacing until generation of the signal reception window 407.

Figure 7:
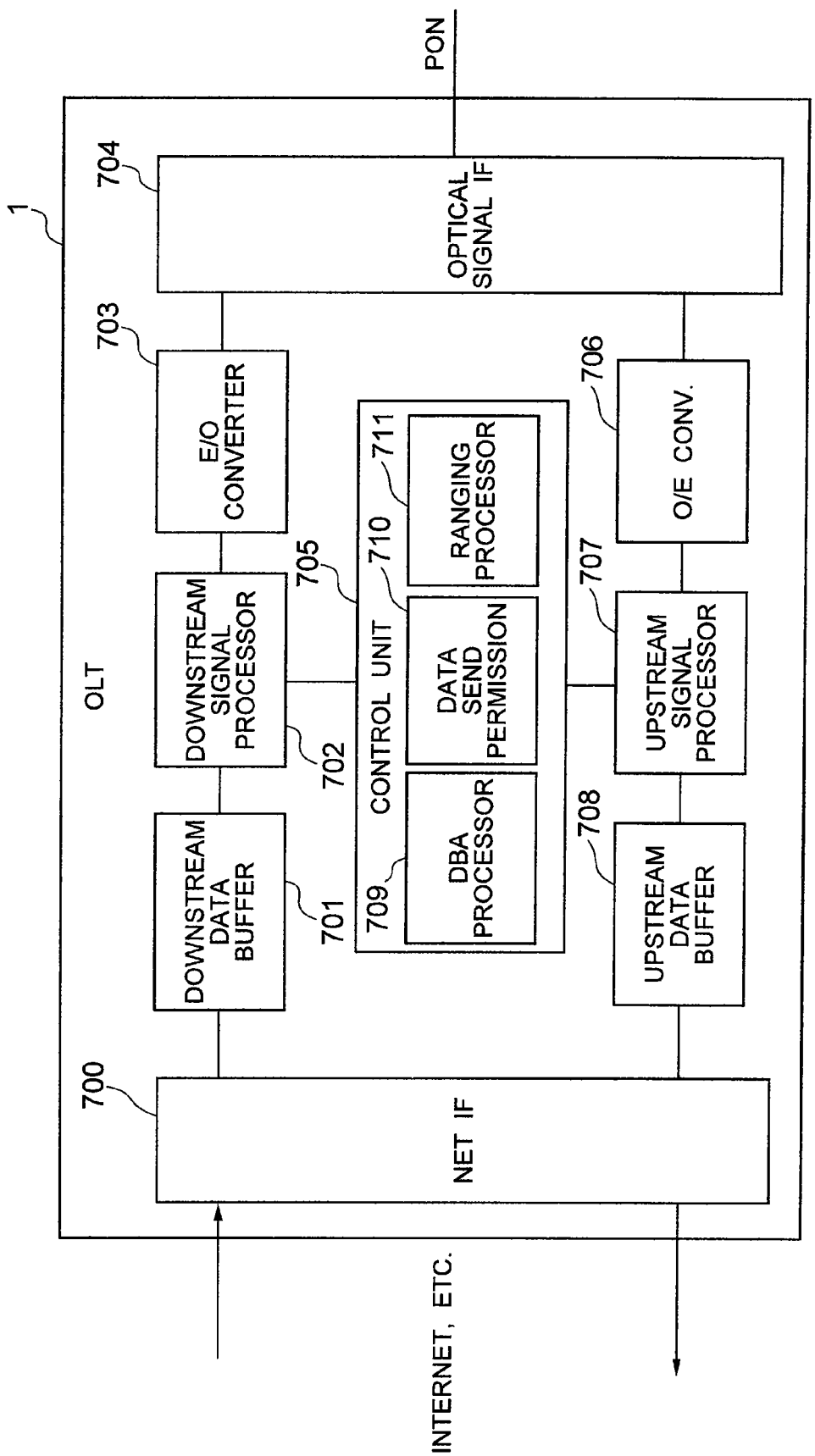
FIG. 7 is a functional block diagram of one example of the OLT.

One example of the OLT 1 is shown in FIG. 7. A network IF unit 700 is an interface for performing signal transmission and reception to and from an upper-level network 18, such as the Internet or the like. A download data buffer 701 is a storage device for temporarily storing therein data as received from the upper-level network 18. A download signal processing unit 702 performs processing tasks needed to send out the data received from the upper-level network 18 toward the PON 19. An electrical/optical (E/O) conversion unit 703 converts an electrical signal into an optical signal. An optical signal IF unit 704 is an interface for sending and receiving an optical signal(s) to and from one or more ONUs 10. An optical/electrical (O/E) converter unit converts an optical signal received from PON 19 to an electrical signal. An upload signal processor unit 707 performs processing for sending the signal received from PON 19 to the upper-level network 18, such as the Internet or else. An upload data buffer 708 is a storage device which temporarily stores data to be sent to the upper-level network 18.

A control unit 705 has a dynamic bandwidth assignment (DBA) processing unit 709 which performs at regular time intervals dynamic communication band allocation processing with respect to each ONU 10, a ranging processor unit 711 which measures the distance relative to each ONU to thereby determine a data transmission delay time and then notifies it to each ONU, and a data transmission allowing unit 710 which instructs each ONU 10's upload data transmission timing by use of the start value 28 and end value 29 shown in FIG. 2. An example is that the DBA processor unit 709 is responsive to receipt of a report as to the queue length of each ONU 10 which is included in an upload signal, for performing DBA processing at regular time intervals, whereas the data transmission allowing unit 710 determines the start value 28 and end value 29 based on results of such processing and then generates a download signal containing these values to thereby instruct the data send/receive timings to each ONU.

Figure 8:
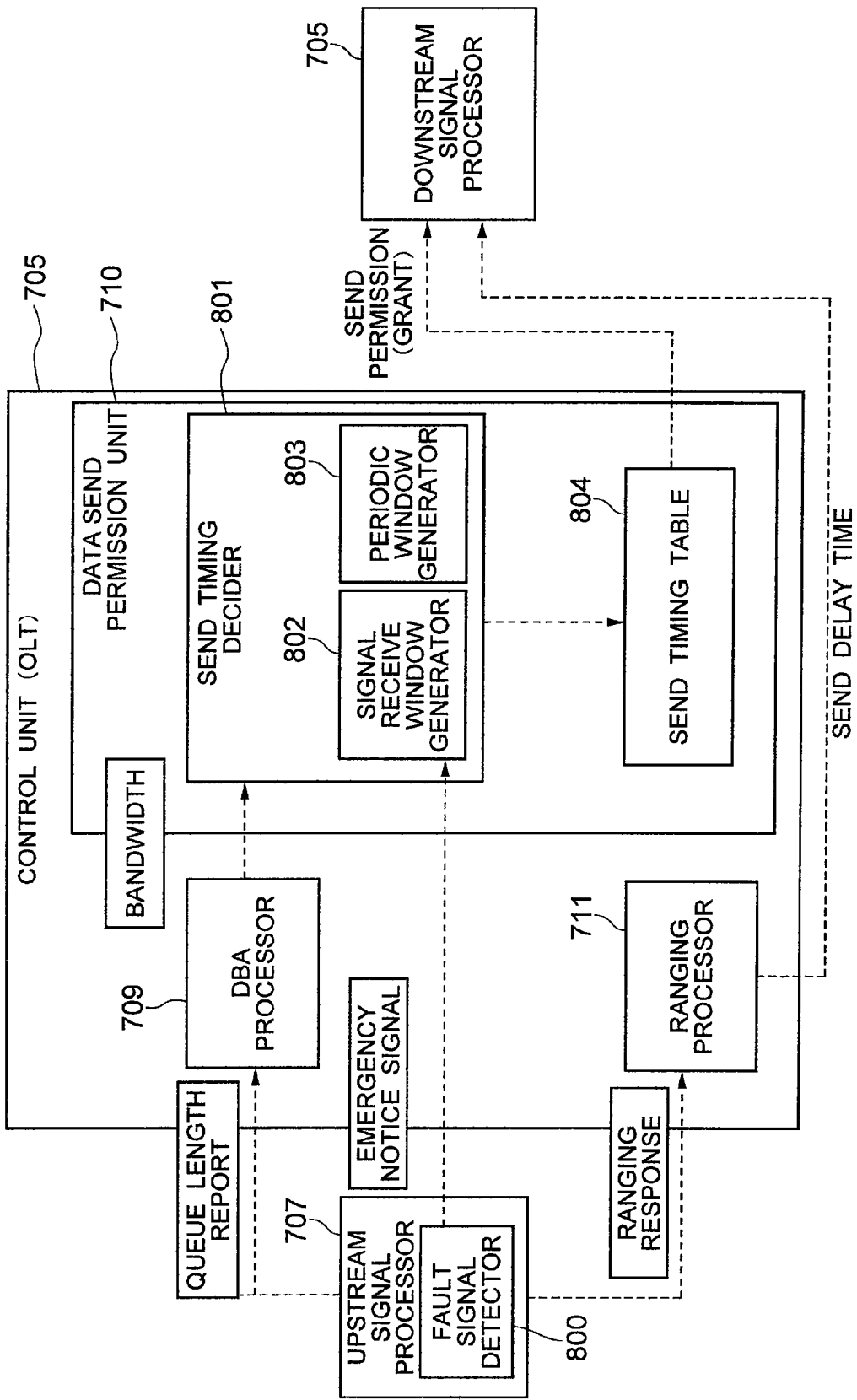
FIG. 8 is a functional block diagram of one example of a control unit in OLT.

FIG. 8 is a diagram for detailed explanation of one example of the control unit 705 of OLT. For example, the DBA processor unit 709 receives from the upload signal processor unit 707 a report as to the queue length that was sent by each ONU and assigns a communication band to each ONU. Information indicative of the exact part of a communication band assigned by DBA to each ONU is input to the data transmission allowing unit 710. Additionally, in cases where the emergency notification signal 404 is received from an obstruction-occurred ONU at reception of a download signal, an obstruction signal detection unit 800 of the upload signal processor unit 707 detects an emergency notification signal made up of the emergency delimiters 500 shown in FIG. 5 and then notifies it to the data transmission allowing unit 710.

The data transmission allowing unit 710 includes a signal transmission timing determination unit 801 and a transmission timing table 804. The transmission timing determination unit is responsive to input of a communication band from the DBA processor unit, for determining based on this communication band the start value 28 and end value 29 of each ONU on a per-grant cycle basis. The transmission timing determination unit 801 includes a periodic window generation unit 803 and a signal reception window generation unit 802. The periodic window generator 803 periodically generates, in order to receive the emergency notification signal 404 from ONU, a time zone (window) that does not permit any one of the ONUs to perform signal transmission at a ratio of 4 bytes to 400 bytes as an example. The signal reception window generator unit 802 generates, in order to receive the information notification signal 406 from ONU, a time zone (window) that does not allow any ONU to perform upload signal transmission after elapse of 325 μs, for example, after a fixed length of time since reception of the emergency notice signal 404.

Upon determination of the start value and end value per each ONU, the transmission timing determination unit 801 stores this information in the signal transmission timing table

804. The data transmission allowing unit 710 generates a signal such as that shown in FIG. 2 based on the information being stored in this transmission timing table 804 and instructs the data transmission timing to each ONU via the download signal processor unit 702.

The ranging processor unit 711 measures the distance from each ONU and calculates a transmission delay time matched with each distance and then performs instruction to each ONU.

Figure 9:
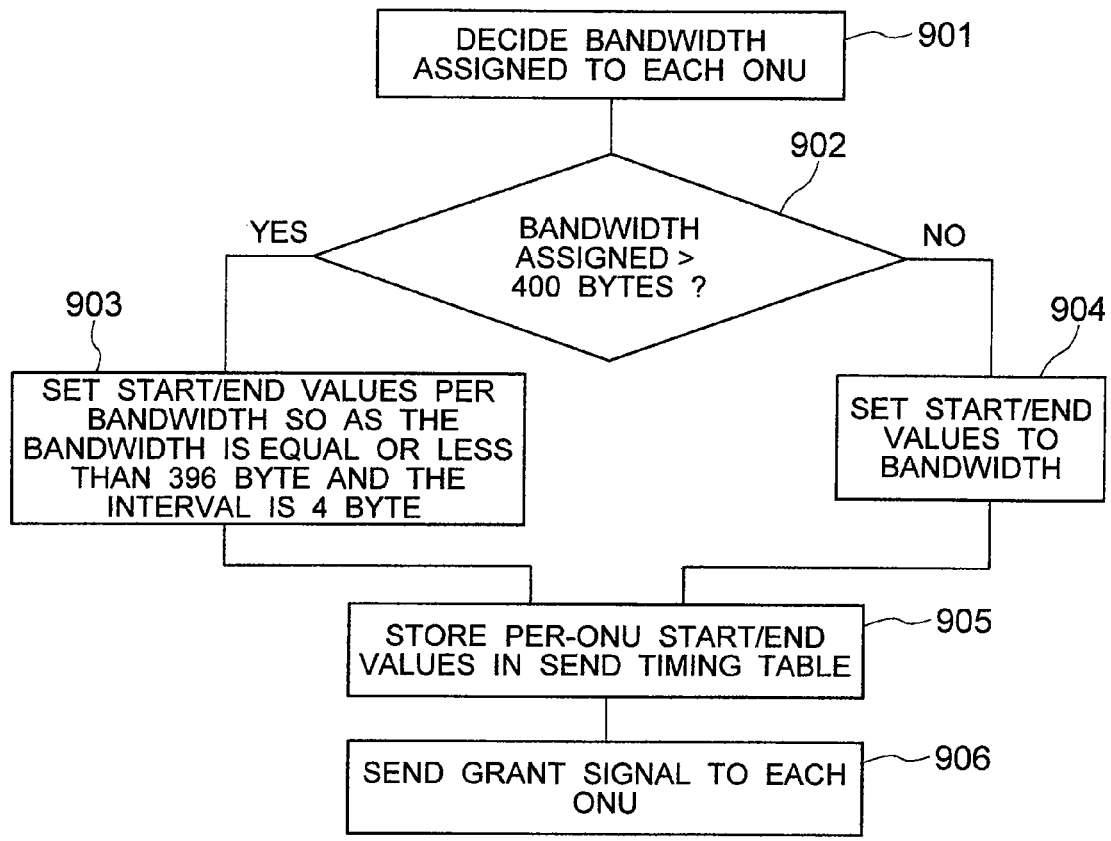
FIG. 9 is a flow chart showing an exemplary processing flow for generation of a periodic window by the control unit of OLT.

FIG. 9 shows an exemplary flow chart of the processing of the control unit 705. What is done first is to determine per DBA-execution cycle a communication band which is assigned by the DBA processor 709 to each ONU (at step 901). Next, the transmission timing determination unit 801 determines whether the byte length of the communication band assigned is in excess of 400 bytes, when determining the start value 28 and end value 29 of each ONU per grant cycle (step 902). In case the data length of one block or "ensemble" with permission of signal transmission does not exceed 400 bytes, set the start and end values so that a subtraction value of the start value from the end value becomes such the data length (904). In other words, the grant is given continuously to a degree corresponding to such data length.

On the other hand, in case the size of a data block with permission being given from now exceeds 400 bytes, the periodic window generator 803 sets up the start and end values so that a subtraction value of the start value from end value becomes 396 bytes; then, a vacant or "null" region of 4 bytes is provided after such end value, followed by division of the remaining data also in such a way that the length of grant is kept less than 400 bytes (at step 903 of FIG. 9).

Figure 17:
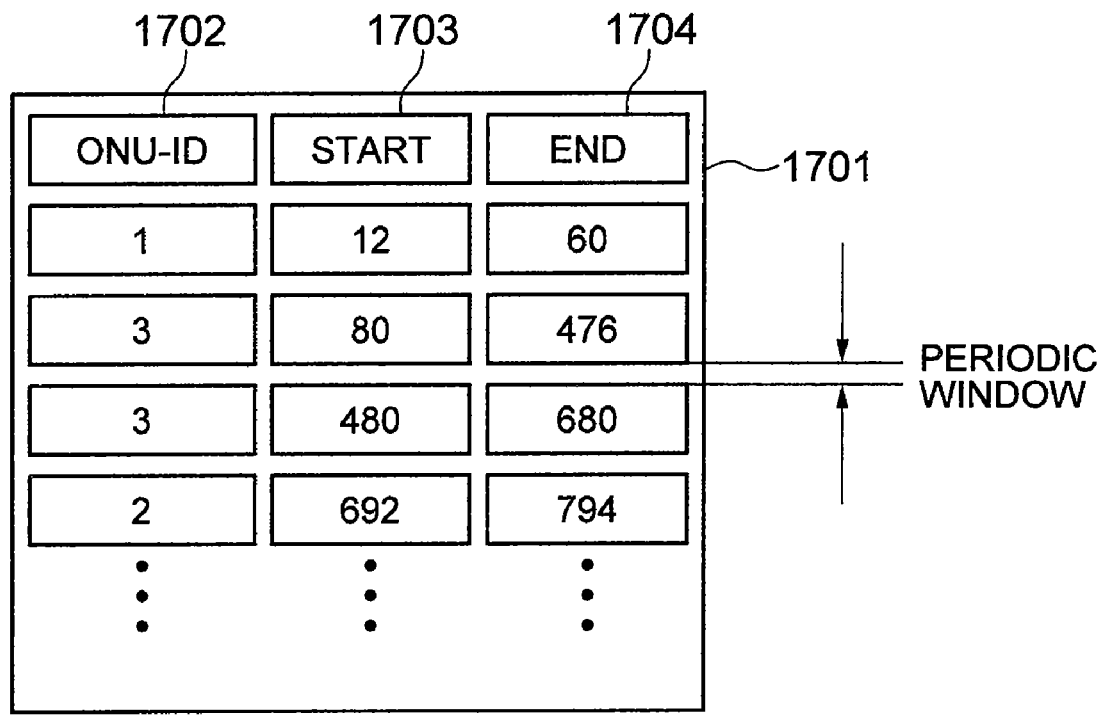
FIG. 17 shows an exemplary transmission timing table which is prepared upon execution of the processing shown in the flow chart of FIG. 9.

FIG. 17 shows one example of the transmission timing table 804 to be prepared in case the processing is executed in a way as defined by the flowchart of FIG. 9. A send timing table 1701 of FIG. 17 is arranged to store therein ONU-ID1 702 which is the information for ONU identification and a couple of start value 1703 and end value 1704 that are assigned to such ONU by the transmission timing determination unit 801. In the example of FIG. 17, the DBA processor 709 allocates a communication band with its length of 48 bytes to ONU #1 having its ONU-ID of 1. In this case the transmission timing determination unit 801 determines for the ONU#1 the start value to be 12 bytes and the end value to be 60 bytes.

Next, in case the DBA processor 709 allocates a 596-byte long communication band to ONU#3 with its ONU-ID of 3 which is in excess of 400 bytes, the periodic window generator 803 divides the 596-byte length data into data segments of 396 bytes and 200 bytes; during this operation, it generates a window of 4 bytes. In the table of FIG. 17, for ONU#3, 80 bytes are assigned to the start value whereas 476 bytes are to the end value—here, the transmission allowance is cut out temporarily, causing 480 bytes after 4 bytes to be set as the start value of the next transmission allowance of ONU#3 while letting 680 bytes capable of sending the whole remaining data be the end value.

It should be noted that although in this embodiment the OLT 1 continues to generate the periodic window, an arrangement may be employable which follows: the OLT 1 is monitoring the signal reception situation of upload data from each ONU, and when the upload data from any given ONU becomes incapable of being received, it is judged on the OLT 1 side that obstruction must occur at any one of the ONUs involved, followed by causing the periodic window generator 803 to get started to generate the periodic window 401. With this arrangement, the periodic window 401 is no longer generated in cases where no obstructions occur at ONUs, so it is possible to more efficiently utilize the communication band of upload data signals.

Figure 10:
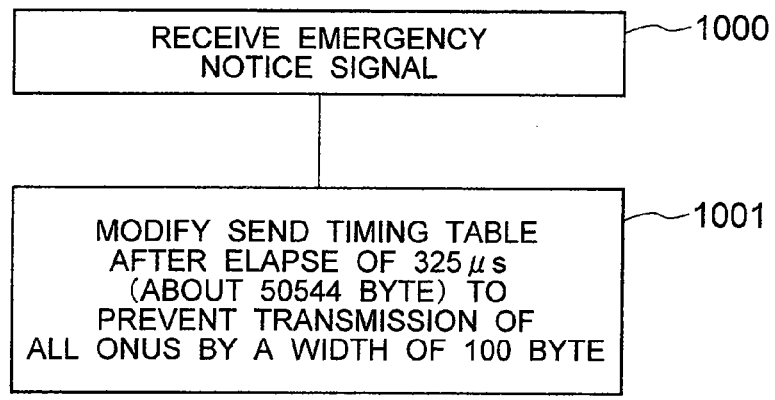
FIG. 10 is a flowchart showing an exemplary processing flow for generation of a signal reception window by the control unit of OLT.

FIG. 10 shows an exemplary flowchart of the processing of the control unit 705 upon receipt of the emergency notification signal 404. When receiving a notice saying that the emergency notice signal 404 was received from the obstruction signal detector 800, the signal reception window generator 802 included in the transmission timing determination unit 801 forcibly prepares a 100-byte long window in the send timing table 804 after elapse of 325 µs since such time point, by way of example. Assuming that the upload signal rate is about 1.25 gigabits per second (Gbps) as an example, 325 µs becomes 50544 bytes in length. Accordingly, the signal reception window generator 802 may prepare on the send timing table 804 a 100-byte long window that does not allow any ONU 10 to send upload data after 50554 bytes from a time point of reception of the emergency notification signal 404. Note here that as the grant cycle is defined to be 125 µs as stated supra, a need is felt in the case of count-up of 325 µs to modify the start value and end value of the send timing table 804 while bridging over a plurality of grant cycles.

Figure 18:
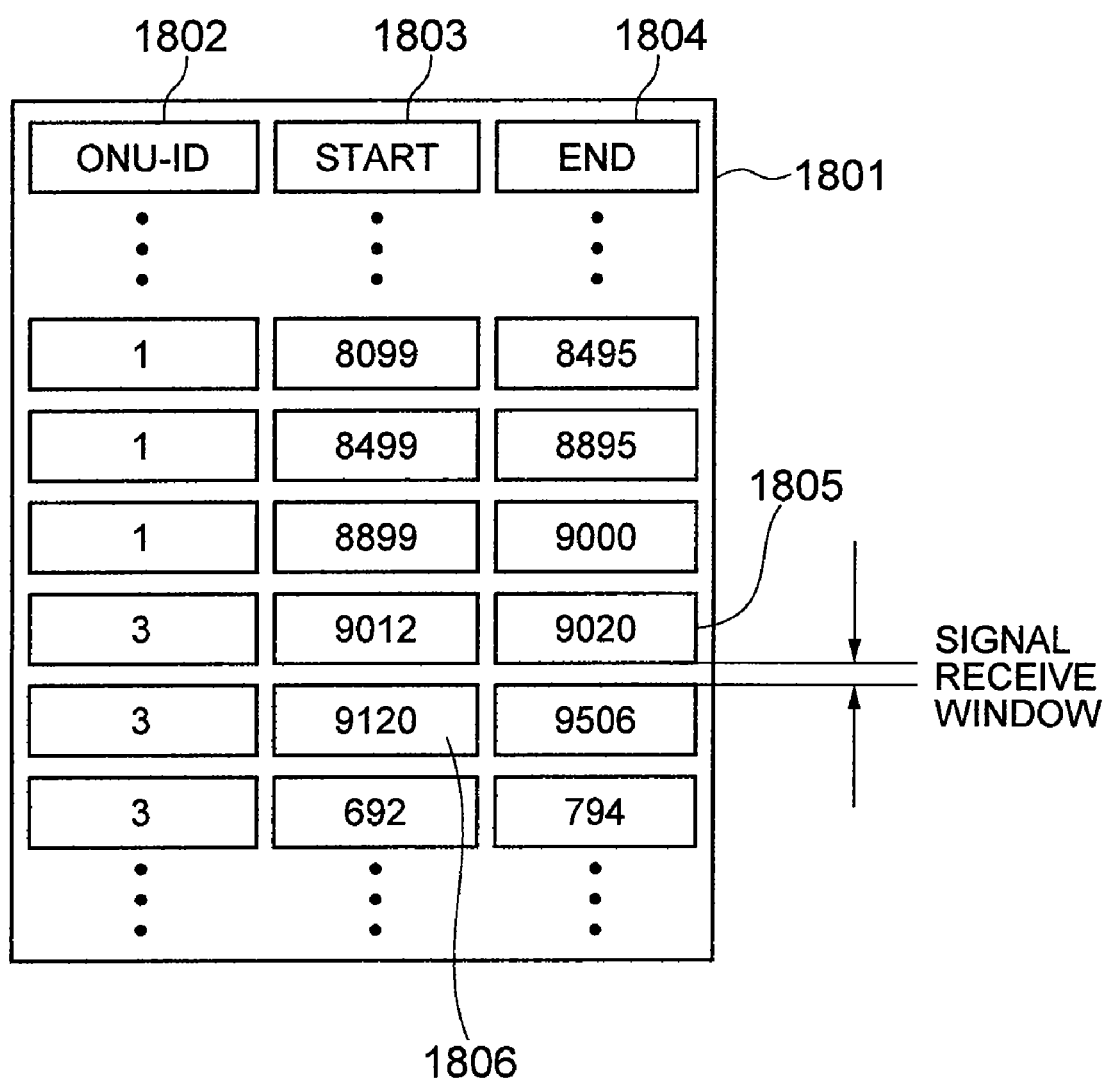
FIG. 18 shows an exemplary transmission timing table to be formed upon execution of the processing shown in the flowchart of FIG. 10.

FIG. 18 shows one example of the transmission timing table 804 to be created when executing the processing shown in the flowchart of FIG. 10. The example of FIG. 18 assumes that the signal reception window generator unit 802 is such that 325 µs from the detection of an emergency notification signal, e.g., 50544-byte length in case the rate of an upload signal is at about 1.24 Gbps, passed the 9020th byte on a transmission timing table 1801 of FIG. 18. The signal reception window generator 802 generates a signal reception window by letting this 9020 bytes be the end value 1805 of ONU#3 that has allowed data transmission at such time point while setting a distance between this end value 1805 and its next start value 1806 to 100 bytes.

Figure 11:
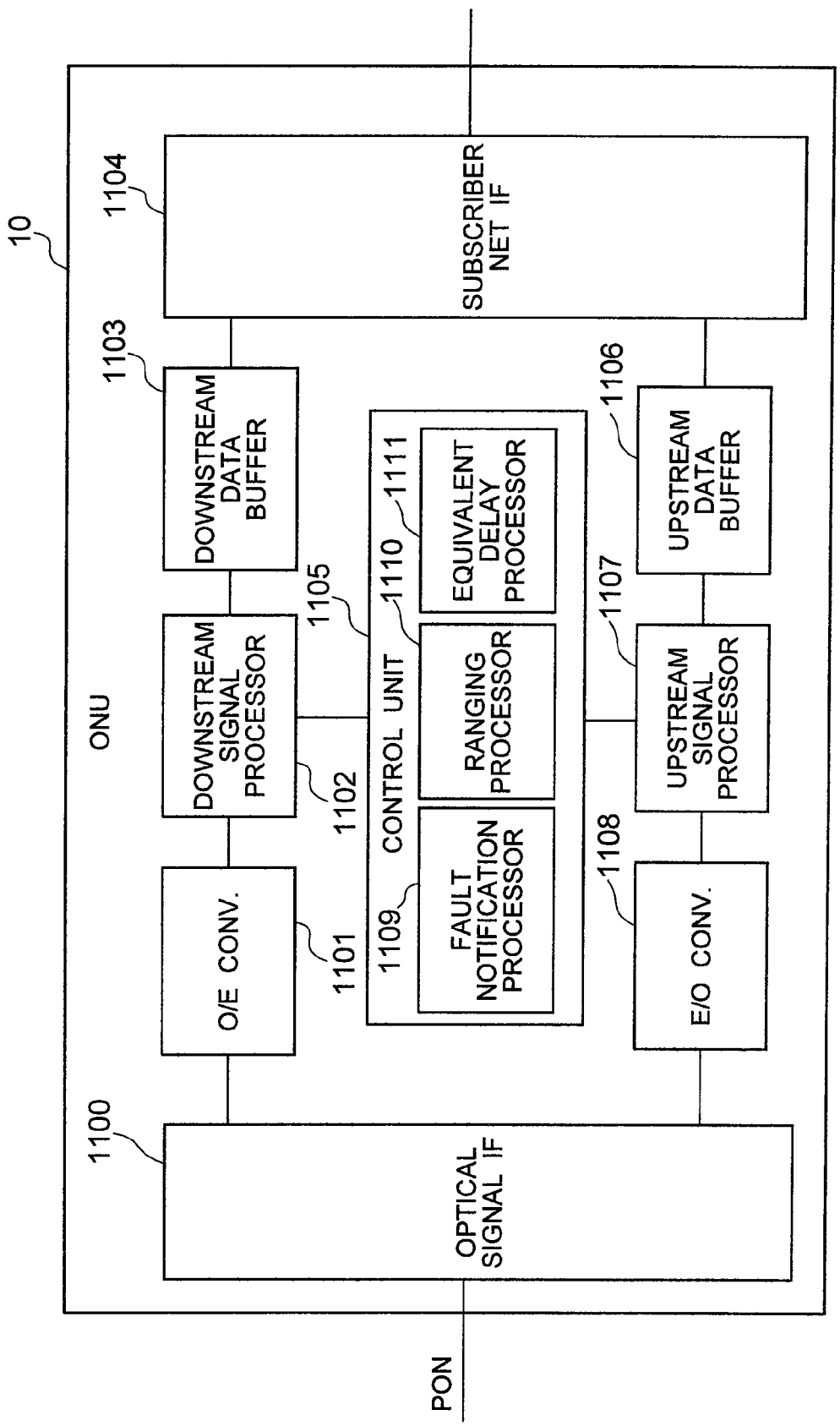
FIG. 11 is a functional block diagram of one example of ONU.

FIG. 11 shows one exemplary configuration of ONU 10. An optical signal IF unit 1100 is an interface which sends and receives an optical signal to and from the OLT 1. An O/E conversion unit 1101 is for converting an optical signal into an electrical signal. A download signal processing unit 1102 performs processing needed to send out the data received from PON 19 toward a subscriber network, such as PC 14 and/or telephone 15 or the like. A download data buffer 1103 is a storage device which temporarily stores therein the data to be sent to the subscriber network. A subscriber network IF unit is an interface for sending and receiving a signal(s) to and from a device owned by a subscriber, such as PC 14 or telephone 15 or else. An upload data buffer 1106 is a storage device for temporarily storing data received from the subscriber network. An upload signal processing unit 1107 performs processing necessary to send out the data received from the subscriber network to PON 19. An E/O converter unit 1108 converts an electrical signal to an optical signal.

A control unit 1105 has an obstruction notification processing unit 1109 which executes a series of processing tasks for notifying the OLT 1 of obstruction, a ranging processor unit 1110 for performing ranging processing between it and OLT 1, and an equivalent delay processing unit 1111 which sets with respect to the start value to be instructed from OLT 1 a transmission delay time in order to transmit upload data at the timing with addition of a transmission delay time that is instructed from OLT 1.

Figure 12:
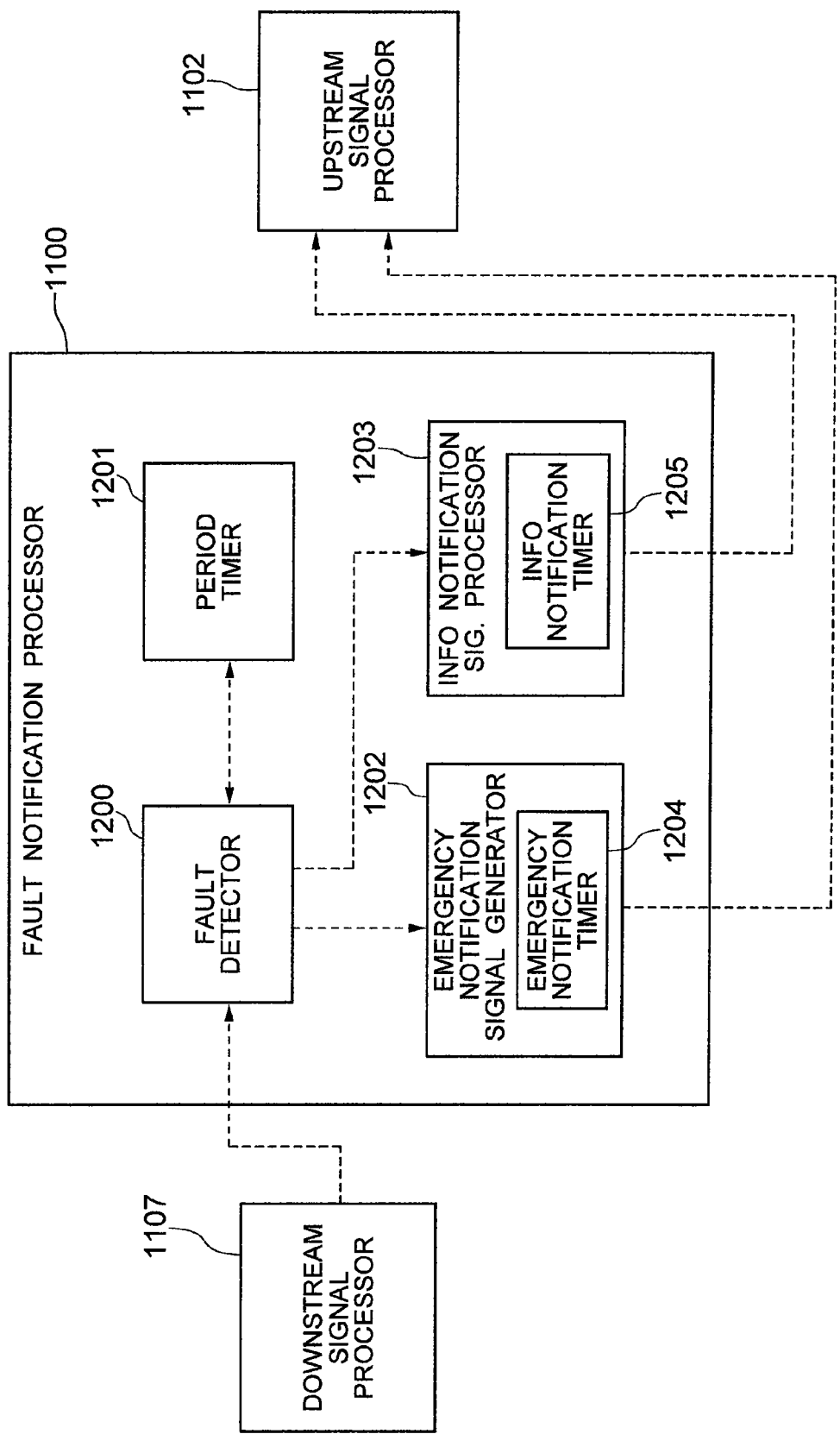
FIG. 12 is a functional block diagram of one example of an obstruction notification processing unit in ONU.

FIG. 12 is a diagram showing an exemplary detailed configuration of the obstruction notification processor unit 1109. In case certain kind of obstruction is found in a download signal to be received from the OLT 1, such the obstruction is passed to an obstruction detecting unit 1200 via the download signal processor unit 1107 or the like. Upon detection of abnormality in the download signal, the obstruction detector causes a cycle timer 1201 to get started, thereby measuring a cycle of emergency notice signal transmission. In addition, the obstruction detector 1200 instructs an emergency notice signal generation unit 1202 to transmit an emergency notice signal to the OLT 1 and further instructs an information notice signal generation unit 1203 to send an information notice signal to OLT 1 after elapse of a predefined length of time.

The emergency notice signal generator unit 1202 is responsive to receipt of a notice from the obstruction detector 1200 for continuously sending an emergency notice signal, such as that shown in FIG. 5, within a fixed length of time period. An emergency notice timer 1204 that is owned by the emergency notice signal generator 1202 is for use in execution of management as to the length of a time duration of this emergency notice signal being sent continuously. Additionally the information notice signal generator 1203 is responsive to receipt of a notice from the obstruction detector 1200 for sending forth to OLT 1 an information notice signal such as that exemplified in FIG. 5 after elapse of a predefined length of time to be measured by the information notice timer 1205—e.g., 325 μs.

Figure 13:
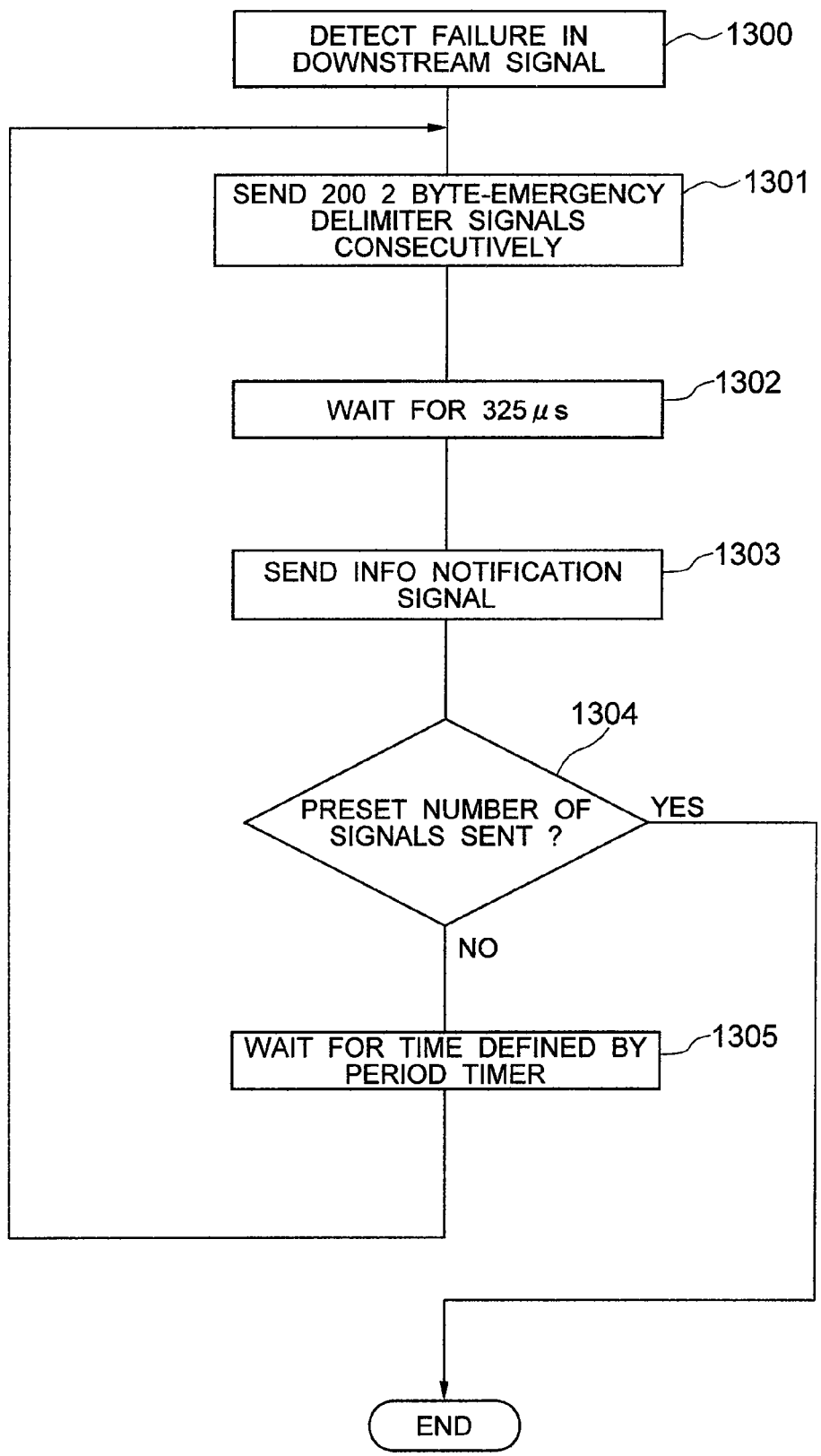
FIG. 13 is a flow diagram showing an exemplary processing flow to be executed by the obstruction notifying processor unit of ONU.

FIG. 13 is one example of a processing flowchart of the obstruction notice processing unit 1109. When this obstruction notice processor 1110 detects certain kinds of abnormality or obstruction in a download signal from OLT 1 (at step 1300), the emergency notice signal generator 1202 sends an emergency notification signal (step 1301). In this case, the embodiment sends in succession for 200 times emergency delimiters each having a length of 2 bytes, for example. Thereafter, it waits for a predefined length of time that is determined by the information notice timer 1205, e.g., 325 μs (1302). Then, the information notice signal generator 1203 generates and sends an information notice signal (1303).

The obstruction notice processor 1110 verifies whether the series of processes for sending the emergency notice signal and the info notice signal is executed a predetermined number of times (1304). This processing is the one that ascertains a counter for repeatedly executing the series of processes in case the periodic window 401 to be generated by the OLT 1 is not enough in length and, for the very reason, the emergency notice signal that was sent one time is not always received without failure. When the periodic window 401 is generated with a sufficiently short cycle, if the OLT 1 is able to reliably receive the once-sent emergency notice signal, it is no longer necessary to repeat the steps 1301 to 1303 a plurality of times. Here, if the routine of steps 1301-1303 has already been repeated a preset number of times then the series of processes for obstruction notification is ended. On the contrary, if the processing is not yet executed the preset number of times then wait for a time as counted by the period timer 1201, e.g., one second or ten seconds (1305); thereafter, execute the steps 1301-1305. If the cycle is 1 second or 10 seconds, it is possible to send a series of notice signals at the frequency that does not affect the other upstream traffic.

Figure 14:
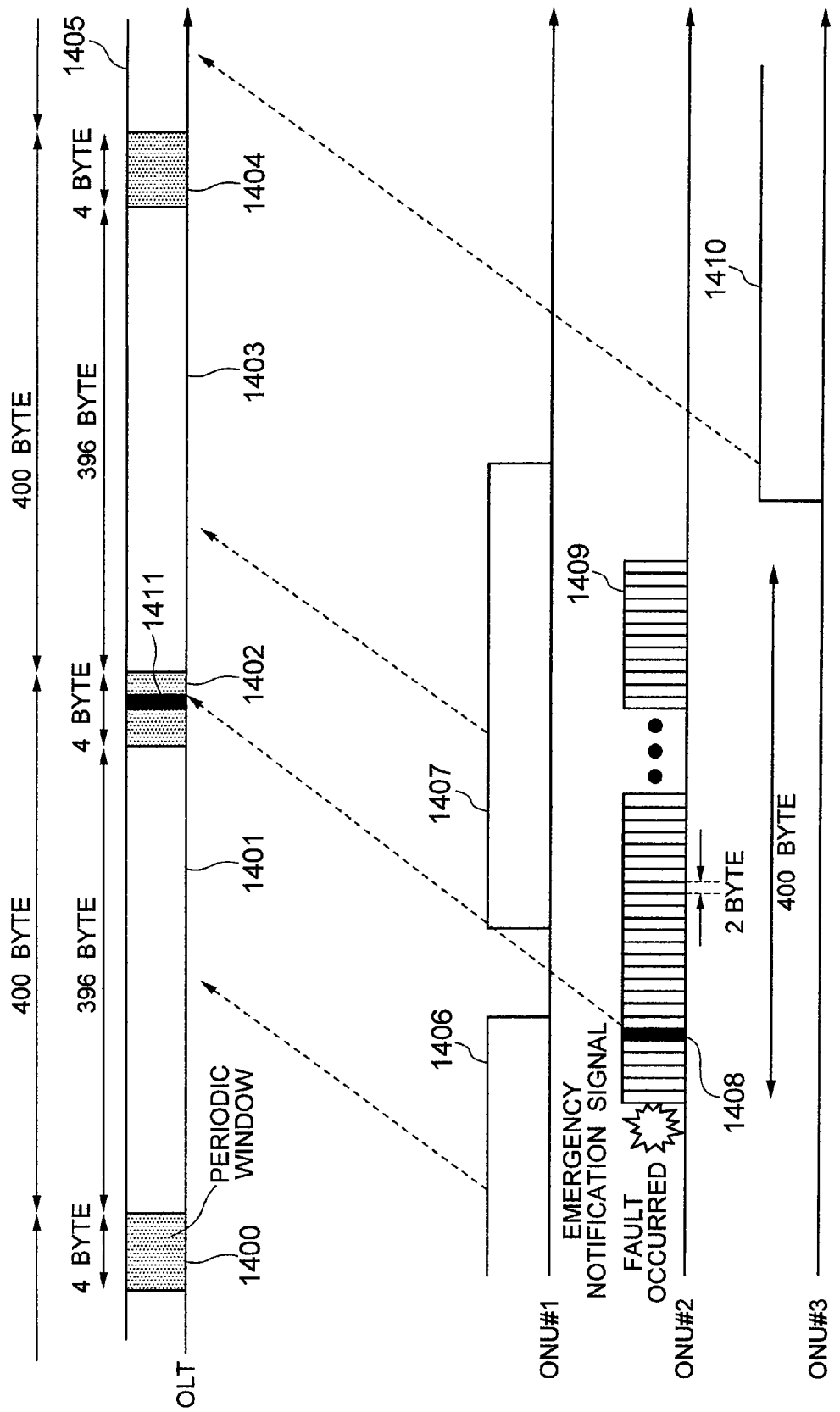
FIG. 14 shows state changes of major functional units upon reception and transmission of an emergency notification signal.

FIG. 14 is a diagram for explanation of one example of a process for generating a periodic window and emergency notice signal by the OLT 1 and ONU 10 of this embodiment. As shown herein, at the OLT 1 side, 4-byte long periodic windows 1400, 1402 and 1404 are generated with a cycle of 400 bytes. In a zone between adjacent ones of these windows, signal transmission is granted to the ONU. For example, in a time period 1401 between the periodic windows 1400 and 1402, OLT 1 receives data 1406 from ONU#3.

Here, when obstruction occurs at ONU#2, this ONU#2 transmits a small signal, e.g., an emergency notification signal 1409 having a serial combination of 2-byte long emergency delimiters, to the OLT 1 within a fixed length of time period, for example, a duration of 400 bytes in length. Although most part of the emergency notification signal 1409 collides with the signal of ONU#1, an emergency notice signal that was sent while overlapping the periodic window 1402 is properly received by OLT 1. In this way, it is possible for OLT 1 to detect the occurrence of obstruction at any one of the ONUs 10.

Figure 15:
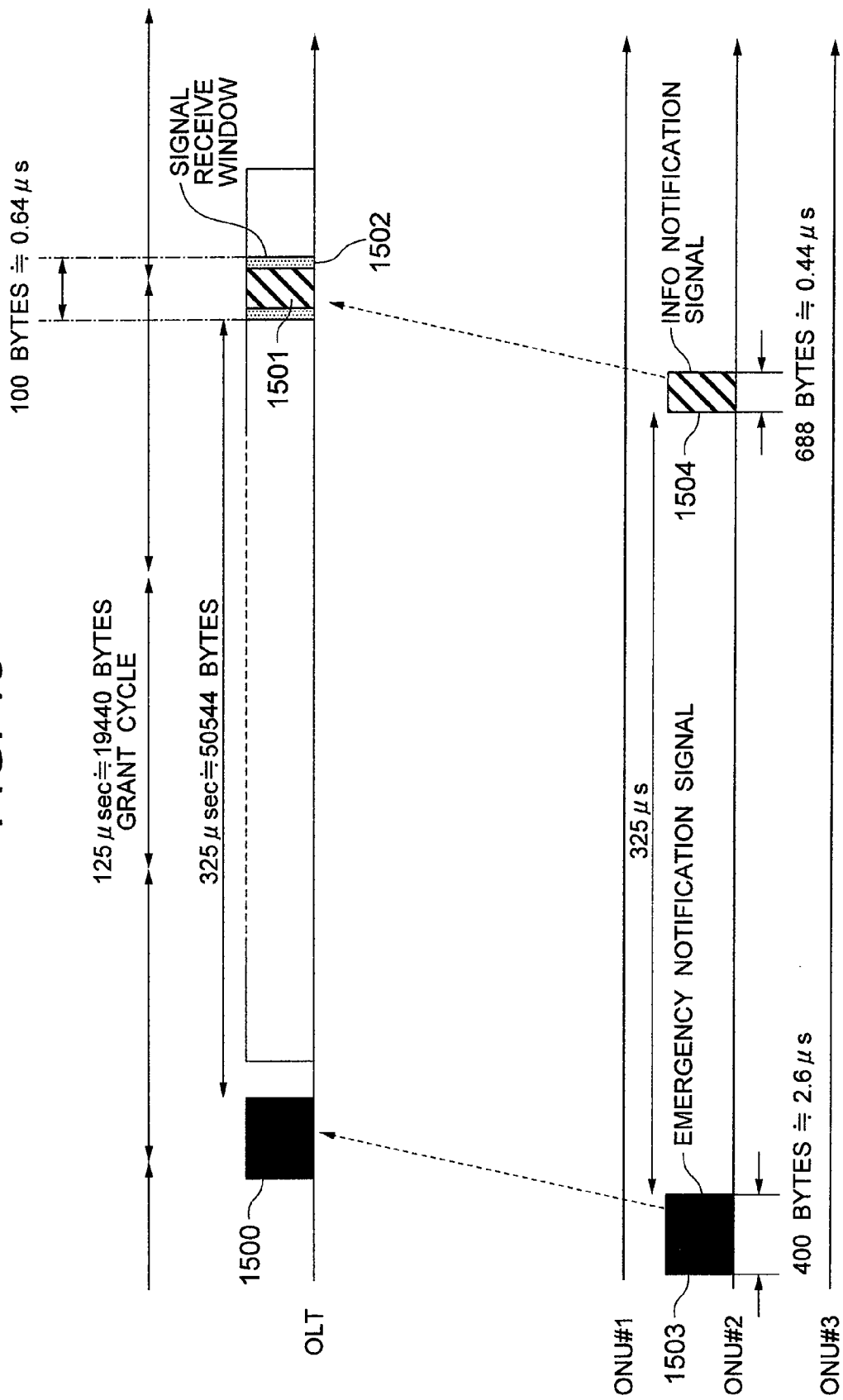
FIG. 15 shows state changes of major units during transmission and reception of an information notification signal.

FIG. 15 is a diagram showing one example of the way that the ONU#2 of this embodiment sends an information notification signal after elapse of a fixed length of time since reception of an emergency notice signal. When the ONU#2 sends an emergency notice signal 1503 with its length of 400 bytes, it sends an information notification signal 1504 for a fixed length of time after elapse of 325 μs, for example. On the OLT 1 side, it prepares a signal reception window 1502 for receipt of the information notice signal after elapse of a fixed length of time, e.g., after 325 μs, after having received an emergency notice signal 1500 from the ONU#2. OLT 1 receives the information notice signal 1504 within this signal reception window 1502 so that it is possible to know what kind of obstruction occurs at ONU#2.

Figure 16:
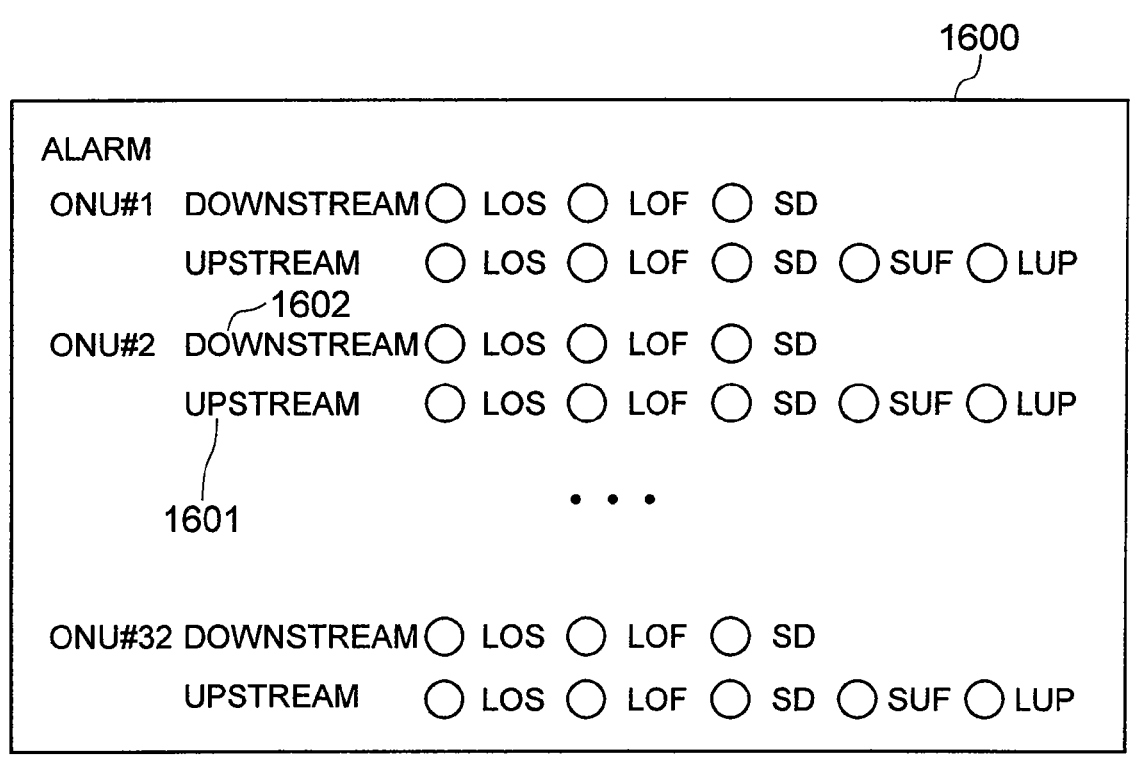
FIG. 16 is a pictorial representation of an on-screen display image of a control/monitor system.

FIG. 16 shows an exemplary monitor screen of ONU obstruction to be displayed in the monitor/control system 1003 in the illustrative embodiment. As it is possible to notify a download alarm 1602 by use of the embodiment method in addition to an upload alarm 1601, it is possible to accurately recognize a present state of the obstruction of ONU 10 from the monitor/control system 1003. On this screen, a new alarm LUP (loss of up-link) is displayed. If no upstream information is receivable by OLT 1 even by use of the embodiment method, this means that it is very likely that obstruction occurs either at transmitter circuit part of ONU 10 or at the individual receiver circuitry within OLT 1. According to this invention, it is possible to provide as new information an alarm that has not been defined in the prior art.

As apparent from the foregoing description, according to this embodiment, it becomes possible for the ONU that becomes unable to receive any download signal from the OLT 1 to report to OLT 1 a present state of its own device. In particular, in cases where a communication alarm takes place such as the loss of signal (LOS) due to accidental disruption of a download signal within ONU, the clock of ONU 10 goes into an asynchronous state with synchronization with OLT 1 being cut out. An emergency notification signal to be sent in the upstream direction in this asynchronous state is such that its sync relationship with another ONU is also cut out, resulting in the risk of unwanted collision of these upload signals. Even in this case, it is possible by providing the periodic window 410 and/or the signal reception window 407 on the OLT side as in the illustrative embodiment to receive the information concerning the obstruction to be sent from ONU while at the same time avoiding collision with upload data from the other ONUs.

It should be further understood by those skilled in the art that although the foregoing description has been made on embodiments of the invention, the invention is not limited thereto and various changes and modifications may be made without departing from the spirit of the invention and the scope of the appended claims.

The invetion claimed is:

1. A station-side apparatus connected via an optical branch to a plurality of subscriber-side devices including optical network units (ONUs), for periodically instructing upload signal transmission timing to each subscriber-side device, said apparatus comprising:

a periodic window generation unit operative to periodically generate a first window which does not permit upload signal transmission to any one of the subscriber-side devices; and a signal reception window generation unit responsive to receipt of a signal informing occurrence of obstruction from any given ONU within the first window generated by said periodic window generation unit, for generating a second window which does not permit upload signal transmission to an one of the subscriber-side devices after elapse of a predefined length of time since the receipt of said signal, wherein said signal informing occurrence of obstruction is an emergency-use delimiter signal as generated to have a pattern different from that of a delimiter signal.

2. A station-side apparatus connected via an optical branch to a plurality of subscriber-side devices including optical network units (ONUs), for periodically instructing upload signal transmission timing to each subscriber-side device, said apparatus comprising:

a periodic window generation unit operative to periodically generate a first window which does not permit upload signal transmission to any one of the subscriber-side devices; and a signal reception window generation unit responsive to receipt of a signal informing occurrence of obstruction from any given ONU within the first window generated by said periodic window generation unit, for generating a second window which does not permit upload signal transmission to an one of the subscriber-side devices after elapse of a predefined length of time since the receipt of said signal, wherein said first window is generated by said periodic window generation unit with a cycle of 400 bytes in length and wherein said first window is 4 bytes in width.

3. A station-side apparatus connected via an optical branch to a plurality of subscriber-side devices including optical network units (ONUs), for periodically instructing upload signal transmission timing to each subscriber-side device, said apparatus comprising:

a periodic window generation unit operative to s periodically generate a first window which does not permit upload signal transmission to any one of the subscriber-side devices; and a signal reception window generation unit responsive to receipt of a signal informing occurrence of obstruction from any given ONU within the first window generated by said periodic window generation unit, for generating a second window which does not permit upload signal transmission to any one of the subscriber-side devices after elapse of a predefined length of time since the receipt of said signal, wherein said first window is less in width than said second window.

4. A subscriber-side device connected via an optical branch to a station-side apparatus for receiving from said station-side apparatus an instruction as to upload signal transmission timing, said device comprising:

an emergency notification signal generation unit operative to generate, when a download signal from said station-side apparatus becomes incapable of being received properly, an emergency notification signal including a series of more than two signals for notifying said station-side apparatus of occurrence of an abnormality; and an information notification signal generation unit for generating an information notification signal for reporting contents of the abnormality to said station-side apparatus after elapse of a predefined length of time since generation and transmission of the emergency notification signal, wherein said emergency notification signal is a signal comprising a series array of two-byte length signals with a total length of 400 bytes.

5. A subscriber-side device connected via an optical branch to a station-side apparatus for receiving from said station-side apparatus an instruction as to upload signal transmission timing, said device comprising:

an emergency notification signal generation unit operative to generate, when a download signal from said station-side apparatus becomes incapable of being received properly, an emergency notification signal including a series of more than two signals for notifying said station-side apparatus of occurrence of an abnormality; and an information notification signal generation unit for generating an information notification signal for reporting contents of the abnormality to said station-side apparatus after elapse of a predefined length of time since generation and transmission of the emergency notification signal, wherein said predefined length of time is 325 microseconds.

6. A subscriber-side device connected via an optical branch to a station-side apparatus for receiving from said station-side apparatus an instruction as to upload signal transmission timing, said device comprising:

emergency notification signal generation unit operative to generate, when a download final from said station-side apparatus becomes incapable of being received properly, an emergency notification signal including a series of more than two signals for notifying said station-side apparatus of occurrence of an abnormality; and an information notification signal generation unit for generating an information notification signal for reporting contents of the abnormality to said station-side a apparatus after elapse of a predefined length of time since generation and transmission of the emergency notification signal, wherein transmission of said emergency notification signal and transmission of said information notification signal after elapse of the predefined length of time are repeated a plurality of times.

* * * * *